United States Patent Office 3,250,702
Patented May 10, 1966

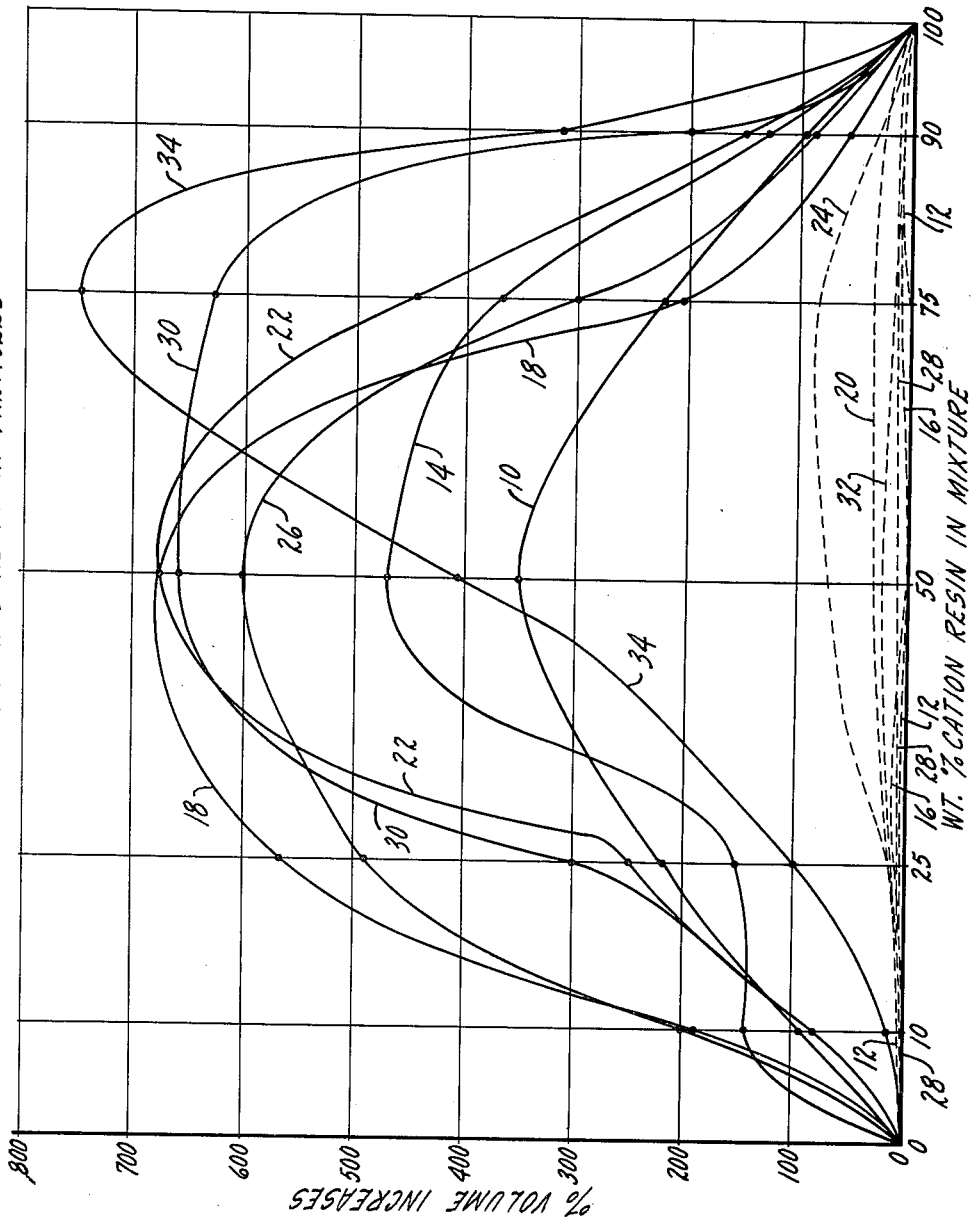

3,250,702
PROCESS FOR PURIFYING LIQUIDS AND PARTICULATE ION EXCHANGE MATERIAL USED THEREFOR
Joseph A. Levendusky, Bayonne, N.J., assignor to Union Tank Car Company, Chicago, Ill., a corporation of New Jersey
Filed Mar. 8, 1963, Ser. No. 263,811
14 Claims. (Cl. 210—24)

This application is a continuation-inpart of applicant's co-pending application Serial No. 133,670 filed August 24, 1961, now abandoned, and assigned to the same assignee as this application.

This invention relates to a composition and method for removing impurities from liquids and, more particularly, to compositions and methods of removing impurities from liquids with ion exchange resin particles in size range of about 60 to 400 mesh.

It has recently been discovered that improved removal of impurities from a fluid may be obtained by passing the fluid through a filter screen pre-coated with a layer of ion exchange resin particles in the size range of about 60 to 400 mesh, hereinafter referred to sometimes as "finely divided" resin particles. This method is disclosed and claimed in applicant's above-mentioned co-pending application and in applicant's co-pending application Serial No. 263,999, filed concurrently herewith and assigned to the same assignee as this application. Furthermore, beds of the finely divided resin particles may be used to remove impurities from fluids, though this is not as effective or as practical as the techniques disclosed in the above-mentioned applications. As used hereinafter the term "bed" refers to a layer, such as a pre-coat layer which has been deposited on a filter screen, a film, a deep or shallow bed or the like.

However, even a very shallow bed of finely divided anion or finely divided cation resin particles creates a large pressure drop to the liquid passing therethrough. A large pressure drop across the bed of resin particles is, of course, undesirable in an impurity removal system as it necessitates larger pumps and/or smaller flow rates in the system.

It is therefore an object of the present invention to provide a method for removing impurities from a liquid with finely divided resin particles in the size range of about 60 to 400 mesh wherein the pressure drop through a bed of said finely divided resin particles is reduced.

It is another object of the present invention to provide a composition for removing impurities from a liquid wherein the pressure drop through a bed of said composition is reduced.

These and other objects more apparent hereinafter are accomplished in accordance with the present invention by employing in an impurity removal system for liquids a bed comprising a mixture of cation and anion exchange resin particles in the size range of about 60 to 400 mesh, said finely divided cation resin particles comprising in the range of about 5 to 95% by weight of said mixture. A bed of mixed anion and cation finely divided resin particles mixed in accordance with the present invention reduces the pressure drop to the liquid passing therethrough during treatment.

The invention, both as to its organization and method of operation, taken with further objects and advantages thereof, will be understood by reference to the following description taken in conjunction with the accompanying drawing, in which:

The figure is a graph of the "Volume Increase By Mixing Anion and Cation Large Bead Resin Particles and By Mixing Anion and Cation Finely Divided Resin Particles."

In accordance with the present invention impurities are removed from a liquid by passing the liquid through a bed comprising a mixture of anion and cation resin particles in the size range of about 60 to 400 mesh the cation resin comprising in the range of about 5 to 95% by weight of the finely divided resin particles in the mixture. When these anion and cation finely divided resin particles are mixed in accordance with the present invention, the pressure drop across a bed of such resin particles is substantially less than the pressure drop across a bed of equal thickness of anion or cation finely divided resin particles.

The manner in which the present invention achieves the unexpected reduction in pressure drop is not fully understood. It has been theorized that when the anion and cation finely divided resin particles are mixed they tend to agglomerate or "clump" with one another to form larger particles. Because of the formation of these larger particles a greater void space is provided in a bed of finely divided resin particles whereby there is less resistance to the flow of liquid through the bed. This theory is supported by the fact that the volume of a mixture of anion and cation finely divided resin particles in accordance with the present invention is far greater than the volume of the mixture in the dry state. However, the present invention is not to be limited by any theory because, irrespective of its mode of operation, the invention effects impurity removal from liquids with an unexpected reduction in the pressure drop across a bed of the finely divided resin particles.

The mixture of anion and cation finely divided resin particles of the present invention may be utilized in any manner used to treat liquid streams with standard ion exchange resin particles having a size range of 20 to 50 mesh and hereinafter referred to as "large bead" resin particles. However, it is preferred to utilize the mixture of finely divided resin particles of the present invention in the manner described in detail in applicant's previously mentioned applications, e.g., as a pre-coat layer on a filter screen, as far greater impurity removal is effected.

In any event, the impurity-bearing liquid to be treated is passed through a bed comprising a mixture of the finely divided resin particles of the present invention. Impurity removal is at least effected by the ion exchange capacity of these finely divided resin particles. As is well known in the art, resin particles having ion exchange properties will remove certain dissolved impurities from a liquid. For example, soluble, silicas, chloride compounds, compounds of calcium and magnesium, such as the sulfates and bicarbonates, and the like, may be removed from a water stream by the mixture of finely divided resin particles of the present invention. Also, if the finely divided resin particles of the present invention are used in accordance with the techniques disclosed in aplicant's co-pending applications, substantial removal of undissolved impurities, such as colloidal silica, iron and copper, may also be achieved.

The present invention has application to the purification of liquids, for example, the removal of formic acid from formaldehyde, the removal of color bodies and ash from sugar solutions, the conversion of potassium ions to sodium ions in wines and the removal of dissolved and undissolved impurities in water streams as mentioned above. Preferably the present invention is utilized in purirying aqueous solutions and most preferably water streams, such as condensate water from a steam generating system.

The cation finely divided resin should be about 5 to 95% by weight of the finely divided resins in the mixture of the present invention. Preferably the cation finely divided resin particles comprise, on a weight basis, in the range of about 10 to 90%, more preferably in the range of about 20 to 80% and most preferably in the range of about 40 to 60%, of the finely divided resin particles in the mixture of the present invention. About 50% cation finely divided resin particles by weight is the most preferred mixture. In addition, it is preferred to employ finely divided resin particles in the size range of 100 to 400 mesh, most preferably in the size range of 200 to 400 mesh. It is further preferred that a major portion (i.e., greater than 50%) of the finely divided resin particles comprise, on a weight basis, particles in the size range of 100 to 400 mesh, most preferably in the size range of 200 to 400 mesh.

Typical solid cation exchange resin particles which may be employed in the present invention are the divinylbenzene-styrene copolymer type, the acrylic type, the sulfonated coal type and the phenolic type. These may be used in the sodium, hydrogen, ammonium or hydrazine form, for example. Typical solid anion exchange resin particles that may be employed in the present invention are the phenol-formaldehyde type, the divinylbenzene-styrene copolymer type, the acrylic type and the epoxy type. The anion resin particles may be used in the hydroxide or chloride form, for example. These anion and cation resin compositions are well known in the art in the large bead form, i.e., in the size range of 20 to 50 mesh. For example, such resins are sold in the large bead form under the tradenames of Amberlite IR-120 and Amberlite IRA-400, manufactured and sold by Rohm & Haas Company, and Nalco HCR and Nalco SBR-P, sold by Nalco Chemical Company. The finely divided resins employed in the present invention are made by grinding these well known large bead resins to the desired size range. The finely divided resin particles are regenerated and washed prior to use as with the large bead resin particles.

If the finely divided resins of the present invention are to be utilized as a pre-coat layer in the manner described in applicant's previously mentioned co-pending applications, it is preferred that the precoat layer have a thickness in the range of about 1/16 to 2 inches, more preferably about 1/8 to 1 inch, and most preferably 1/8 to 5/8 inch.

Some of the advantages of the present invention will be seen from the following examples:

EXAMPLE I

In this test the effect of mixing finely divided anion and cation exchange resin particles and of mixing large bead anion and cation exchange resin particles was compared. The finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion exchange resin particles were in the chloride form and the large bead and finely divided cation exchange resin particles were in the sodium form.

The following procedure was followed with the finely divided resin particles. Measured amounts of anion and cation finely divided resins were mixed in predetermined percentages by weight in graduated cylinders containing demineralized water. The mixture of resin particles was then allowed to stand in the graduated cylinders until no further volume change of the resin particles occurred. The volume of the mixed resin particles was then determined and compared with the volume of the mixed resin particles in the dry state to determine the volume increase of the mixture of finely divided resin particles.

The same procedure was followed with mixtures of the large bead anion and cation exchange resin particles. The amounts, volumes and results of these tests are given in Table A:

*Table A.—Volume increase by mixing anion and cation large bead resin particles and by mixing anion and cation finely divided resin particles*

|  | Large bead anion and cation resin particle mixtures | | | | | Finely divided anion and cation resin particle mixtures | | | | |
|---|---|---|---|---|---|---|---|---|---|---|
| Test No. | 1 | 2 | 3 | 4 | 5 | 6 | 7 | 8 | 9 | 10 |
| Volume cation resin particles, cc | 2.5 | 5.8 | 11.6 | 17.3 | 19.7 | 2.4 | 5.8 | 11.8 | 17.6 | 21.0 |
| Volume anion resin particles, cc | 26.5 | 22.0 | 15.4 | 8.4 | 3.8 | 27.3 | 22.8 | 14.6 | 7.3 | 3.4 |
| Total volume resin particle mixture in dry state, cc | 29.0 | 27.8 | 27.0 | 25.7 | 23.5 | 29.7 | 28.6 | 26.4 | 24.9 | 24.4 |
| Dry weight ratio cation and anion resin particles | 1:9 | 1:3 | 1:1 | 3:1 | 9:1 | 1:9 | 1:3 | 1:1 | 3:1 | 9:1 |
| Percent by weight cation resin particles in mixture | 10 | 25 | 50 | 75 | 90 | 10 | 25 | 50 | 75 | 90 |
| Volume of mixture when combined and after settling, cc | 29.0 | 29.0 | 27.0 | 25.0 | 24.0 | 56.5 | 90.5 | 118.5 | 79.0 | 46.5 |
| Percent volume increase | 0 | 4.3 | 0 | −2.8 | +2.1 | 90.4 | 216 | 349 | 217 | 90.5 |

The results of the volume increase tests in this example have been plotted in the figure. The solid line curve indicated by reference numeral 10 represents the finely divided resin particle mixtures and the dotted line curve indicated by reference numeral 12 represents the large bead resin particle mixtures. There was no volume increase when 100% anion or cation large bead or finely divided resin particles were used.

EXAMPLE II

The testing procedure of Example I was repeated. As in Example I the finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion resin particles were in the hydroxide form and the large bead and finely divided cation resin particles were in the sodium form.

The amounts, volumes and results of these tests are given in Table B:

*Table B.—Volume increase by mixing anion and cation large bead resin particles and by mixing anion and cation finely divided resin particles*

| | Large bead anion and cation resin particle mixtures | | | | | Finely divided anion and cation resin particle mixtures | | | | |
|---|---|---|---|---|---|---|---|---|---|---|
| Test No. | 1 | 2 | 3 | 4 | 5 | 6 | 7 | 8 | 9 | 10 |
| Volume cation resin particles, cc | 2.5 | 5.8 | 11.6 | 17.3 | 19.7 | 2.4 | 5.8 | 11.8 | 17.6 | 21.0 |
| Volume anion resin particles, cc | 37.5 | 30.0 | 20.0 | 10.4 | 4.3 | 32.5 | 26.6 | 18.0 | 9.4 | 3.9 |
| Total volume resin particle mixture in dry dry state, cc | 40.0 | 35.8 | 31.6 | 27.7 | 24.0 | 34.9 | 32.4 | 29.8 | 27.0 | 24.9 |
| Dry weight ratio cation and anion resin particles | 1:9 | 1:3 | 1:1 | 3:1 | 9:1 | 1:9 | 1:3 | 1:1 | 3:1 | 9:1 |
| Percent by weight cation resin particles in mixture | 10 | 25 | 50 | 75 | 90 | 10 | 25 | 50 | 75 | 90 |
| Volume of mixture when combined and after settling, cc | 39.0 | 39.0 | 31.5 | 28.5 | 26.0 | 85.0 | 81.0 | 170.0 | 126.0 | 52.0 |
| Percent volume increase | −2.5 | +8.9 | −0.3 | +2.9 | +8.3 | 143 | 150 | 470 | 367 | 109 |

The results of the volume increase tests in this example have been plotted in the figure. The solid line curve indicated by reference numeral 14 represents the finely divided resin particle mixtures and the dotted line curve indicated by reference numeral 16 represents the large bead resin particle mixtures. There was no volume increase when 100% anion or cation large bead or finely divided resin particles were used.

EXAMPLE III

The testing procedure of Example I was repeated. As in Example I the finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion resin particles were in the chloride form and the large bead and finely divided cation resin particles were in the hydrogen form.

The amounts, volumes and results of these tests are given in Table C:

The results of the volume increase tests in this example have been plotted in the figure. The solid line curve indicated by reference numeral 18 represents the finely divided resin particle mixtures and the dotted line curve indicated by reference numeral 20 represents the large bead resin particle mixtures. There was no volume increase when 100% anion or cation large bead or finely divided resin particles were used.

EXAMPLE IV

The testing procedure of Example I was repeated. As in Example I the finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion resin particles were in the hydroxide form and the large bead and finely divided cation resin particles were in the hydrogen form.

*Table C.—Volume increase by mixing anion and cation large bead resin particles and by mixing anion and cation finely divided resin particles*

| | Large bead anion and cation resin particle mixtures | | | | | Finely divided anion and cation resin particle mixtures | | | | |
|---|---|---|---|---|---|---|---|---|---|---|
| Test No. | 1 | 2 | 3 | 4 | 5 | 6 | 7 | 8 | 9 | 10 |
| Volume cation resin particles, cc | 2.9 | 7.0 | 14.1 | 20.4 | 24.0 | 3.1 | 7.2 | 14.8 | 21.0 | 26.8 |
| Volume anion resin particles, cc | 26.5 | 23.5 | 15.5 | 8.0 | 3.2 | 27.3 | 22.8 | 14.6 | 7.3 | 3.4 |
| Total volume resin particle mixture in dry state, cc | 29.4 | 30.5 | 29.6 | 28.4 | 27.2 | 30.4 | 30.0 | 29.4 | 28.3 | 30.2 |
| Dry weight ratio cation and anion resin particles | 1:9 | 1:3 | 1:1 | 3:1 | 9:1 | 1:9 | 1:3 | 1:1 | 3:1 | 9:1 |
| Percent by weight cation resin particles in mixture | 10 | 25 | 50 | 75 | 90 | 10 | 25 | 50 | 75 | 90 |
| Volume of mixture when combined and after settling, cc | 30.0 | 34.0 | 38.5 | 38.1 | 33.5 | 89.0 | 200.0 | 218.0 | 85.0 | 47.0 |
| Percent volume increase | 2.0 | 11.5 | 30.0 | 34.2 | 23.2 | 193 | 567 | 675 | 200 | 55.6 |

The amounts, volumes and results of these tests are given in Table D:

Table D.—Volume increase by mixing anion and cation large bead resin particles and by mixing anion and cation finely divided resin particles

| | Large bead anion and cation resin particle mixtures | | | | | Finely divided anion and cation resin particle mixtures | | | | |
|---|---|---|---|---|---|---|---|---|---|---|
| Test No | 1 | 2 | 3 | 4 | 5 | 6 | 7 | 8 | 9 | 10 |
| Volume cation resin particles, cc | 3.4 | 7.3 | 13.7 | 21.0 | 25.0 | 3.1 | 7.2 | 14.8 | 21.0 | 26.8 |
| Volume anion resin particles, cc | 38.0 | 32.0 | 21.4 | 11.0 | 4.6 | 32.5 | 26.6 | 18.0 | 9.4 | 3.9 |
| Total volume resin particle mixture in dry state, cc | 41.1 | 39.3 | 35.1 | 32.0 | 29.6 | 35.6 | 33.8 | 32.8 | 30.4 | 30.7 |
| Dry weight ratio cation and anion resin particles | 1:9 | 1:3 | 1:1 | 3:1 | 9:1 | 1:9 | 1:3 | 1:1 | 3:1 | 9:0 |
| Percent by weight cation resin particles in mixture | 10 | 25 | 50 | 75 | 90 | 10 | 25 | 50 | 75 | 90 |
| Volume of mixture when combined and after settling, cc | 41.0 | 44.0 | 61.0 | 58.5 | 37.5 | 65.0 | 120.0 | 254.0 | 164.0 | 70.0 |
| Percent volume increase | −1.0 | 12 | 73.8 | 82.8 | 26.7 | 82.5 | 255 | 675 | 448 | 128 |

The results of the volume increase tests in this example have been plotted in the figure. The solid line curve indicated by reference numeral 22 represents the finely divided resin particle mixtures and the dotted line curve indicated by reference numeral 24 represents the large bead resin particle mixtures. There was no volume increase when 100% anion or cation large bead or finely divided resin particles were used.

EXAMPLE V

The testing procedure of Example I was repeated. As in Example I the finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion resin particles were in the chloride form and the large bead and finely divided cation exchange resin particles were in the ammonium form.

The amounts, volumes and results of these tests are given in Table E:

The results of the volume increase tests in this example have been plotted in the figure. The solid line curve indicated by reference numeral 26 represents the finely divided resin particle mixtures and the dotted line curve indicated by reference numeral 28 represents the large bead resin particle mixtures. There was no volume increase when 100% anion or cation large bead or finely divided resin particles were used.

EXAMPLE VI

The testing procedure of Example I was repeated. As in Example I the finely divided and large bead resin particles were of the divinylbenzene-styrene copolymer type. The finely divided resin particles were in the size range of 100 to 400 mesh, while the large bead resin particles were in the size range of 20 to 50 mesh. A major portion of the finely divided resin particles, on a weight basis, were in the size range of 200 to 400 mesh. The large bead and finely divided anion resin particles were in the hydroxide form and the large bead and finely divided cation resin particles were in the ammonium form.

Table E.—Volume increase by mixing anion and cation large bead resin particles and by mixing anion and cation finely divided resin particles

| | Large bead anion and cation resin particle mixtures | | | | | Finely divided anion and cation resin particle mixtures | | | | |
|---|---|---|---|---|---|---|---|---|---|---|
| Test No | 1 | 2 | 3 | 4 | 5 | 6 | 7 | 8 | 9 | 10 |
| Volume cation resin particles, cc | 2.5 | 5.8 | 11.6 | 17.4 | 20.8 | 2.7 | 6.0 | 12.6 | 17.6 | 21.0 |
| Volume anion resin particles, cc | 27 | 22 | 15.2 | 8 | 3.3 | 27.3 | 22.8 | 14.6 | 7.3 | 3.4 |
| Total volume resin particle mixture in dry state, cc | 29.5 | 27.8 | 26.8 | 25.4 | 24.1 | 30.0 | 28.8 | 27.2 | 24.9 | 24.4 |
| Dry weight ratio cation and anion resin particles | 1:9 | 1:3 | 1:1 | 3:1 | 9:1 | 1:9 | 1:3 | 1:1 | 3:1 | 9:1 |
| Percent by weight cation resin particles in mixture | 10 | 25 | 50 | 75 | 90 | 10 | 25 | 50 | 75 | 90 |
| Volume of mixture when combined and after settling, cc | 29.5 | 29.5 | 30.0 | 28.0 | 26.0 | 90.5 | 170.0 | 190.0 | 100.0 | 46.0 |
| Percent volume increase | 0 | 6.1 | 7.9 | 10.3 | 7.9 | 201 | 490 | 600 | 302 | 89 |

The amounts, volumes and results of these tests are given in Table F:

*Table F.—Volume increase by mixing anion and cation large bead resin particles and by mixing anion and cation finely divided resin particles*

|  | Large bead anion and cation resin particle mixtures | | | | | Finely divided anion and cation resin particle mixtures | | | | |
|---|---|---|---|---|---|---|---|---|---|---|
| Test No | 1 | 2 | 3 | 4 | 5 | 6 | 7 | 8 | 9 | 10 |
| Volume cation resin particles, cc | 2.7 | 6.1 | 12.0 | 17.8 | 21.0 | 2.7 | 6.0 | 12.6 | 17.6 | 21 |
| Volume anion resin particles, cc | 38.0 | 30.5 | 21.0 | 10.4 | 4.5 | 32.5 | 26.6 | 18.0 | 9.4 | 3.9 |
| Total volume resin particle mixture in dry state, cc | 40.7 | 36.6 | 33.0 | 28.1 | 25.5 | 35.2 | 32.6 | 30.6 | 27.0 | 24.9 |
| Dry weight ratio cation and anion resin particles | 1:9 | 1:3 | 1:1 | 3:1 | 9:1 | 1:9 | 1:3 | 1:1 | 3:1 | 9:1 |
| Percent by weight cation resin particles in mixture | 10 | 25 | 50 | 75 | 90 | 10 | 25 | 50 | 75 | 90 |
| Volume of mixture when combined and after settling, cc | 40.7 | 40.5 | 42.0 | 34.0 | 28.0 | 72.0 | 134.0 | 230.0 | 196.0 | 74.0 |
| Percent volume increase | 0 | 8.4 | 21.4 | 17.3 | 8.9 | 105 | 310 | 653 | 626 | 197 |

The results of the volume increase tests in this example have been plotted in the figure. The solid line curve indicated by reference numeral 30 represents the finely divided resin particle mixtures and the dotted line curve indicated by reference numeral 32 represents the large bead resin particle mixtures. There was no volume increase when 100% anion or cation large bead or finely divided resin particles were used.

EXAMPLE VII

The testing procedure of Example I was repeated with finely divided resin particles in the size range of 60 to 400 mesh. A major portion of the finely divided resin particles, on a weight basis, were in the size range of 200 to 400 mesh. The finely divided resin particles were of the divinylbenzene-styrene copolymer type, the anion resin particles being in the hydroxide form and the cation resin particles being in the ammonium form.

The amounts, volumes and results of these tests are given in Table G:

*Table G.—Volume increase by mixing anion and cation finely divided resin particles*

|  | Finely divided anion and cation resin particle mixtures | | | | |
|---|---|---|---|---|---|
| Test No | 1 | 2 | 3 | 4 | 5 |
| Volume cation resin particles, cc | 2.7 | 6.0 | 12.6 | 17.6 | 21.0 |
| Volume anion resin particles, cc | 32.5 | 26.5 | 18.0 | 9.4 | 3.9 |
| Total volume resin particle mixture in dry state, cc | 35.2 | 32.6 | 30.6 | 27.0 | 24.9 |
| Dry weight ratio cation and anion resin particles | 1:9 | 1:3 | 1:1 | 3:1 | 9:1 |
| Percent by weight cation resin particles in mixture | 10 | 25 | 50 | 75 | 90 |
| Volume of mixture when combined and after settling, cc | 41.5 | 64.0 | 156 | 230 | 102 |
| Percent volume increase | 17.9 | 97 | 410 | 750 | 310 |

The results of the volume increase tests in this example have been plotted in the figure. The solid line curve indicated by reference numeral 34 represents the finely divided mixtures employed in this example. There was no volume increase when 100% anion or cation finely divided resin particles were used.

It will be seen from Examples I–VII and the figure that mixtures of finely divided resin particles in accordance with the present invention exhibit volume increases of about 40 to 750%, while the mixtures of large bead resin particles generally have volume increases of less than 40%. Furthermore, comparing the volume increase of the finely divided resin particle mixtures with the volume increase of the corresponding large bead resin particle mixtures clearly demonstrates that the volume increase of the finely divided resin particle mixtures is at least two times greater than the volume increase of the large bead resin particle mixtures and generally 10 or more times greater. As will be seen from the following example, finely divided resin particle mixtures of the present invention afford a reduced pressure drop when employed as a bed in a purification system and, furthermore, that the pressure drop across a bed of the finely divided resin particle mixture is related to the volume increase of the resin particle mixture.

EXAMPLE VIII

In each test there was employed a cotton-wound, annular filter screen having an effective porosity of 2 microns. The filter screen was mounted in a tank and pre-coated upon its exterior surface with an ⅛ inch layer of finely divided resin particles. The pre-coat layer was formed by making a slurry of the resin particles with high purity water and passing the slurry through the filter, the finely divided resin particles being deposited upon the exterior surface of the filter as the slurry passed therethrough. After a pre-coat layer of finely divided resin particles of about ⅛ inch had been formed on the filter screen, a condensate water from a steam generating system of a commercial electrical power plant was passed through the filter tank, the pre-coat layer and filter screen at a flow rate of 4 g.p.m./sq. ft. of filter screen.

Various mixtures of anion and cation finely divided resin particles ranging from 100% anion resin particles to 100% cation resin particles were tested. In every test, the anion and cation finely divided resin particles were of the divinylbenzene-styrene copolymer type and in the size range of 100 to 400 mesh. A major portion of the resin particles, on a weight basis, were in the size range of 200 to 400 mesh in each test. The anion finely divided resin particles were in the hydroxide form and the cation finely divided resins were in the ammonium form.

The pressure drop across the filter screen and pre-coat layer in each test was measured by gauges. The pressure drop caused by the filter screen, which had been predetermined by previous tests of the annular cotton-wound filter screens at the same flow rates, was subtracted from the total pressure drop to determine the pressure drop caused by the layer of finely divided resin particles. The results of these tests are given below in Table H:

Table H.—*Pressure drop across pre-coat layer of finely divided resin particle mixtures*

| Percent of weight of cation resin particles in pre-coat layer | Pressure drop across pre-coat layer, p.s.i. |
|---|---|
| 0 | 15–20 |
| 20 | 0.7–1.0 |
| 40 | 0.2–0.3 |
| 60 | 0.2–0.3 |
| 80 | 0.7–1.0 |
| 95 | 1.0–1.5 |
| 100 | 8–10 |

It will be seen from Table H that a bed of 100% anion or cation finely divided resin particles has a relatively high pressure drop, while beds comprising mixtures of anion and cation finely divided resin particles in accordance with the present invention have a substantially reduced pressure drop. Furthermore, the results of Table H substantiate that the pressure drop across a layer of the mixture is related to the percent volume increase of the mixture of anion and cation finely divided resin particles.

It has been found that a ⅛-inch-per-coat layer of large bead resin particles on the same filter screens will not create any measurable pressure drop whether it is 100% anion or cation or a mixture of anion and cation large bead resin particles. However, the impurity removal capacity of such large bead resin particles is low as compared to the finely divided resin particles.

While the embodiment described herein is at present considered to be preferred, it will be understood that various modifications and improvements may be made therein and it is intended to cover in the appended claims all such modifications and improvements as fall within the true spirit and scope of the invention.

What is claimed is:

1. A bed for removing impurities from a liquid which comprises a mixture of anion and cation exchange resin particles, said resin particles being in the size range of about 60 to 40 mesh and said cation resin articles comprising in the range of about 5 to 95% by weight of said resin particles in said mixture.

2. The bed of claim 1 wherein said cation resin particles comprise in the range of about 20 to 80% by weight of said resin particles in said mixture.

3. The bed of claim 1 wherein said resin particles are in the size range of about 200 to 400 mesh.

4. A method for removing impurities from a liquid which comprises passing said liquid through a bed comprising a mixture of anion and cation exchange resin particles, said resin particles being in the size range of 60 to 400 mesh, said cation resin particles comprising in the range of about 5 to 95% by weight of said resin particles in said mixture, a major portion of said resin particles on a weight basis being in the size range of 100 to 400 mesh.

5. The method of claim 4 wherein said cation resin articles are in the hydrogen form and said anion resin particles are in the hydroxide form.

6. The method of claim 4 wherein said cation resin particles are in the ammonium form and said anion resin particles are in the hydroxide form.

7. A method for removing impurities from a liquid which comprises passing said liquid through a bed consisting essentially of a mixture of anion and cation exchange resin particles, said resin particles being in the size range of about 60 to 400 mesh, said cation resin particles comprising in the range of about 5 to 95% by weight of said resin particles in said mixture.

8. The method of claim 7 wherein said cation resin particles are in the hydrogen form and the anion resin particles are in the hydroxide form.

9. The method of claim 7 wherein said cation resin particles are in the hydrogen form and the anion resin particles are in the hydroxide form.

10. A method for purifying water which comprises passing said water through a bed comprising a mixture of anion and cation exchange resin particles, said resin particles being in the size range of about 60 to 400 mesh, said cation resin particles comprising in the range of about 5 to 95% by weight of said resin particles in said mixture.

11. In a liquid treatment system, a method of expanding the volume of finely divided ion exchange resin particles being in the size range of about 60 to 400 mesh, comprising mixing said particles into a bed having the proportions of from about 5 to 95% by weight cation resin particles with the remainder of said resin particles being anion resin particles, whereby the pressure drop of a liquid flowing through said bed is lower than that of a liquid flowing through separate beds of cation and anion particles having the same thickness of said bed of mixed resin particles.

12. A method for reducing the pressure drop of a liquid flowing through a bed of finely divided cation and anion exchange resin particles being in the size range of about 60 to 400 mesh, comprising expanding the volume of said cation and anion resin particles by maintaining said particles as mixture in the range of about 5 to 95% by weight of cation resin particles.

13. The method of removing impurities from a liquid which comprises pre-coating a filter screen by depositing upon said filter screen a layer of a mixture of anion and cation exchange resin particles in the size range of about 60 to 400 mesh, said cation exchange resin particles comprising in the range of about 5 to 95% by weight of said resin particles in said mixture, and passing said liquid through said pre-coated layer and said filter screen.

14. A filter for removing impurities from a liquid which comprises a filter screen having an upstream and downstream side, said upstream side of said filter screen having a layer of pre-coat medium thereon, said pre-coat medium comprising a mixture of anion and cation exchange resin particles in the size range of about 60 to 400 mesh, said cation exchange resin particles comprising in the range of about 5 to 95% by weight of said resin particles in said mixture.

References Cited by the Examiner

UNITED STATES PATENTS

| 1,604,651 | 10/1926 | Manning | 210—24 |
| 2,798,674 | 7/1957 | Denning. | |
| 3,163,597 | 12/1964 | Thrun | 210—24 |

References Cited by the Applicant

UNITED STATES PATENTS

| 2,961,417 | 11/1960 | Small. |
| 3,014,896 | 12/1961 | Colwell et al. |
| 3,128,247 | 4/1964 | Cohen et al. |
| 3,168,486 | 2/1965 | Small. |

MORRIS O. WOLK, *Primary Examiner.*